United States Patent
Pierce

[15] 3,677,467

[45] July 18, 1972

[54] DISC COMPUTER

[72] Inventor: Laurance Pierce, 2302 Calypso Road, Madison, Wis. 53704

[22] Filed: June 23, 1970

[21] Appl. No.: 49,108

[52] U.S. Cl. ....................................235/78, 235/84, 235/88
[51] Int. Cl. ....................................G06g 1/08
[58] Field of Search ....................................235/78, 88, 83, 84

[56] References Cited

UNITED STATES PATENTS

| | | | |
|---|---|---|---|
| 1,962,866 | 6/1934 | Graham | 235/84 |
| 2,342,674 | 2/1944 | Kotcher | 235/84 |
| 2,996,246 | 8/1961 | Swanson | 235/83 |
| 3,486,691 | 12/1969 | Rodriguez | 235/88 |
| 3,512,709 | 5/1970 | Schneible | 235/78 |

*Primary Examiner*—Stephen J. Tomsky
*Attorney*—Joseph G. Werner, Theodore J. Long, John M. Winter and James A. Kemmeter

[57] ABSTRACT

A disc computer having a lower disc with a peripheral scale at the edge of its upper face and an upper disc rotatably and concentrically secured at its center to the first disc. The upper disc being smaller in diameter than the lower disc and having a peripheral scale at the edge of its upper face for use in conjunction with the scale on the lower disc. The upper disc has a pair of diametrically opposed, transparent lugs extending from its peripheral edge substantially to, but not beyond the peripheral edge of the larger bottom disc to facilitate manipulation of the upper disc.

1 Claim, 3 Drawing Figures

Patented July 18, 1972

3,677,467

Laurance Pierce

DISC COMPUTER

FIELD OF THE INVENTION

This invention relates generally to calculating devices and more particularly to manually manipulated concentric disc calculators.

SUMMARY OF THE INVENTION

Basically, my invention comprises a simplified concentric disc calculator having unique manipulating lugs to facilitate expeditious working of the upper disc and yet the lugs are protected against breakage and damage because they do not extend beyond the peripheral edge of the larger bottom disc. Thus, I have provided a uniquely easy to use, yet durable concentric disc calculator.

DETAILED DESCRIPTION

Figures 1, 3:
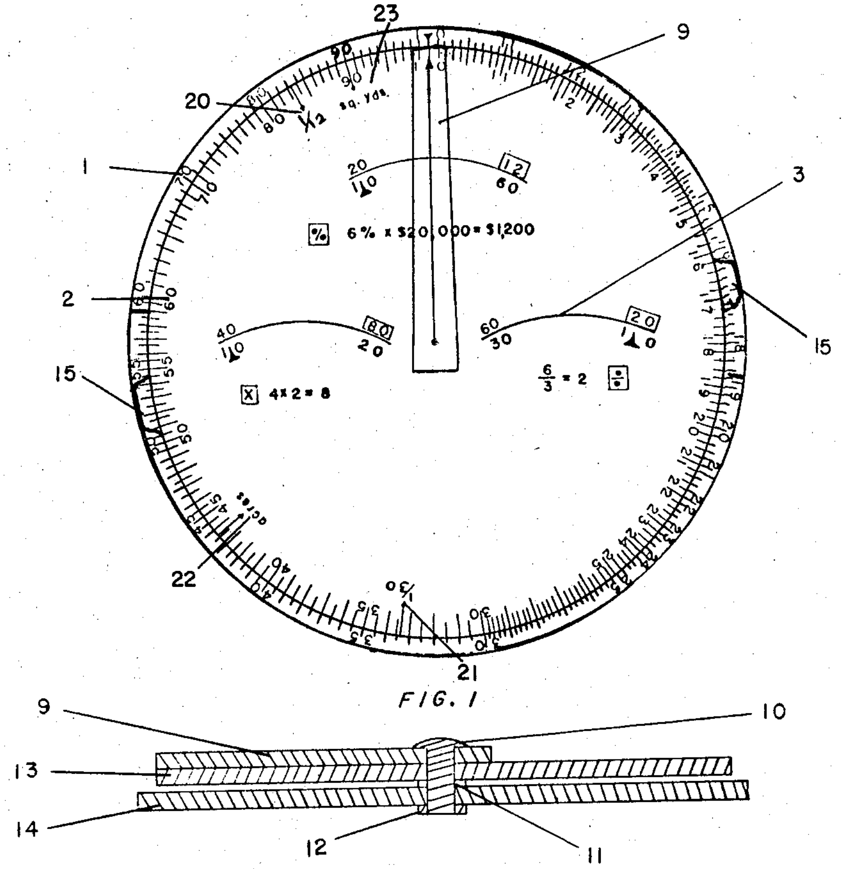
FIG. 1 is a plan view of the front side of the computer showing the 2 log scales on the upper and lower discs and sample formulae. The radial transparent cursor is shown in the "12 o'-clock" position.
FIG. 3 is the cross sectional view.

The computer is comprised of the upper disc, 13, FIG. 3; the lower disc, 14, FIG. 3; the movable radial transparent cursor, 9, FIG. 1 & 3; and the central fastener or pivot assembly, 10, 11, & 12, FIG. 3.

Figure 2:
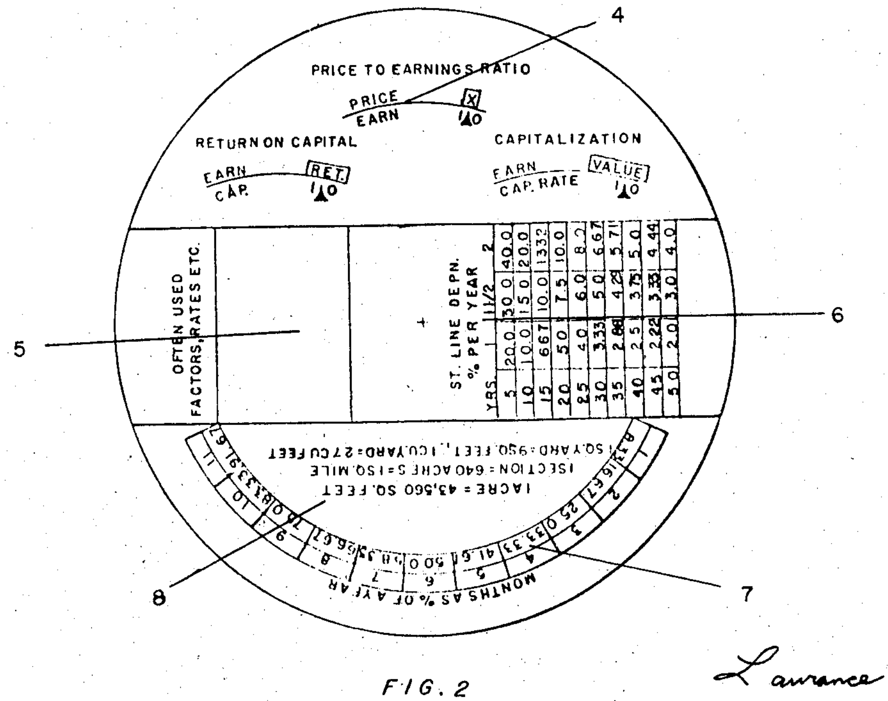
FIG. 2 is the backside of the computer showing the information displayed thereon.

The lower disc, 14, has the largest diameter and carries an arcuate logarithmic scale, 1, on the outer periphery of its front face, FIG. 1, and has printed matter on its backside, FIG. 2. The upper disc, 13, is slightly smaller in diameter than the lower disc, 14. It carries an arcuate logarithmic scale, 2, on its periphery identical to scale, 1, but with some added indices for special functions. These indices, referred to in the drawings by reference numerals 20, 21, 22 and 23, will be:

1. 1/12 for monthly pro-ration of annual amounts.
2. 1/30 for daily pro-ration of monthly amounts.
3. Acres for conversion from square feet to acres and vice-versa, and
4. square yards for conversion from square feet to square yards and vice-versa.

Additionally, the disc, 13, has projecting lugs, 15, to facilitate its rotation and fine alignment. These lugs are transparent. These 2 logarithmic scales, 1 & 2, are proportioned exactly the same, and when the 10 indices are matched, all the scale indices match. These two scales, 1 & 2, are the heart of the mathematical operation of the computer. Two of the four fundamental laws of logarithms are used; $\log MN = \log m + \log N$ and $\log M/N = \log M - \log N$ to perform multiplication and division operations respectively. The logarithms thus derived as a result are expressed as real numbers (antilogarithms) 10, 15, 20, etc. in which the decimal point must be placed by the user.

Percentage problems which will probably be the most common type solved are, of course, multiplication problems although for the user unskilled in mathematics this may not be immediately apparent, so to gain maximum acceptance and utility to all classes of user, these problems (ordinary multiplication and percentage problems) each have a separate sample problem and pictorial solution, 3, displayed on the front face of the computer.

The actual multiplication is performed by placing the 10 index of the scale, 2, directly below the multiplicand. The result will be read directly above the multiplier. The decimal point will then have to be placed by the user.

Division and ratio operations are performed similarly. The numerator is placed directly above the denominator, and the quotient is read directly above the 10 index on the scale, 1.

Successive multiplication or division operations which are to be performed on the resulting numbers of preceding problems are materially aided by provision of the radial transparent cursor, 9. For example, a depreciation schedule may be constructed having a base which is to be annually reduced by a depreciation factor. If the depreciation base is $40,000. and the annual depreciation rate is 5 percent, the 10 index on scale, 2, is placed below 40; the cursor, 9, is moved to the left to 95 on scale, 2, (a reduction of 5 percent); the cursor, 9, remains at 38 on scale, 1, while the 10 on scale, 2, is moved to match the cursor, 9, and 38 on scale, 1, and the process begins again for the next year.

The back face, FIG. 2, of the computer incorporates a printed display of information useful to the types of users for which it is designed. This material has been selected from the great amount that might be useful to prospective users and is somewhat limited because of space requirements. The information falls into 5 categories. 1) Often used Factors, Rates Ratios, etc., 5. This area will be covered with a type of paint or texture of finish which will allow the user to write in formulae or factors, etc. of value to him for his specific needs (i.e. a real estate salesman may wish to put in his commission rates for the sale of various types of properties while a banker may wish to have international monetary rates of exchange, and a certified public accountant may want to have percentage factors for sum-of-the-years-digit depreciation calculations). These data may be written in pencil to allow erasures and changes, or written rather more permanently in ball point pen or india ink. If additional special use space is required, white adhesive or other suitable tape may be used to cover more area of the back, FIG. 2, that is not needed, and the user can write in the necessary information on the tape. 2) Straight Line Depreciation Factors: This table, 6, is arranged to facilitate the quick extraction of percentage factors for straight line, 150 percent and 200 percent of straight line depreciation for amortization periods from five years to 50 at five year intervals. These factors can be applied to construct a depreciation schedule as in the illustration given for the use of the cursor. 3) Months as a Percentage of a Year: This table expresses any number of months from one to 11 as a percentage of a year, so that annual costs and earnings can be pro-rated for any given number of months. Multiplication of an annual figure by the appropriate percentage will give the pro-rated answer. 4) Capitalization Formulae: Three of the formulae, 4, most likely to be used by investors are pictorially displayed. 5) Conversion Factors: Several conversion factors, 8, useful primarily for real estate calculations have been included here.

The central fastener or pivot assembly, 10, 11, 12, is designed to permit adjustment of the friction between components of the computer. The lower nut, 12, is of the self locking type; the pivot screw, 10, has a low profile slotted head which is adjustable by a dime or other coin. A washer, 11, made of a low friction material such as nylon, teflon or other suitable substance is fitted between the discs, 13 & 14, to provide both a bearing surface for reduction of wear and a finer friction adjustment by maintaining a lower coefficient of friction between the 2 discs, 13 & 14, than between the cursor, 9, and the pivot screw, 10, there being a requirement for the cursor, 9, to be relatively fixed in relation to scale, 1, as the disc, 14, is rotated for successive computations as in the depreciation problem illustrated above.

Problems capable of solution on this computer include but are not limited to multiplication, division, ratios, and derivative applications of these such as pro-rations of many types, construction of depreciation, appreciation and depletion schedules, price to earnings ratios, capitalization of value, return on investment, "times earnings", simple interest amounts, square footage, square yardage and acreage conversion, average speeds, fuel consumption, wages and tax amounts from hourly and mil rates, insurance premiums and other costs and accruals.

It is further understood that my invention is not confined to the particular construction and arrangement of parts herein illustrated and described, but embraces all such modified forms thereof as come within the scope of the following claims.

I claim:

1. A disc computer comprising:

a. a first opaque circular disc having a peripheral scale on its upper face, b. a second opaque circular disc rotatably and concentrically attached at its center to the center of said first disc, 1. said second opaque disc having a peripheral scale on its upper face for use in conjunction with the scale on said first disc, and 2. said second disc being smaller in diameter than said underlying first disc whereby the scale on said first disc is exposed beyond the peripheral edge of said second disc, and c. at least one transparent lug fixedly attached to said second disc and extending from the peripheral edge thereof across at least a portion of the scale on said first disc and extending substantially to but not beyond the peripheral edge of said first disc.

* * * * *